US012533380B2

(12) United States Patent
Hong et al.

(10) Patent No.: US 12,533,380 B2
(45) Date of Patent: *Jan. 27, 2026

(54) CULTURE SCAFFOLD FOR PROMOTING STEM CELL DIFFERENTIATION COMPRISING MULTILAYER GRAPHENE FILM

(71) Applicants: SEOUL NATIONAL UNIVERSITY R & DB FOUNDATION, Seoul (KR); BIOGRAPHENE INC., Suwon-si (KR)

(72) Inventors: Byung Hee Hong, Suwon-Si (KR); Ji Yeon Ahn, Seoul (KR); Jong Bo Park, Seoul (KR); Jeong Mook Lim, Seoul (KR); Woo Sub Yang, Seoul (KR)

(73) Assignees: SEOUL NATIONAL UNIVERSITY R & DB FOUNDATION, Seoul (KR); BIOGRAPHENE INC., Suwon-si (KR)

( * ) Notice: Subject to any disclaimer, the term of this patent is extended or adjusted under 35 U.S.C. 154(b) by 1011 days.

This patent is subject to a terminal disclaimer.

(21) Appl. No.: 17/046,248

(22) PCT Filed: Apr. 5, 2019

(86) PCT No.: PCT/KR2019/004061
§ 371 (c)(1),
(2) Date: Oct. 8, 2020

(87) PCT Pub. No.: WO2019/198986
PCT Pub. Date: Oct. 17, 2019

(65) Prior Publication Data
US 2021/0030808 A1 Feb. 4, 2021

(30) Foreign Application Priority Data
Apr. 9, 2018 (KR) .................. 10-2018-0041267

(51) Int. Cl.
A61K 35/28 (2015.01)
C01B 32/186 (2017.01)
C01B 32/19 (2017.01)
C01B 32/194 (2017.01)
C12N 5/0775 (2010.01)

(52) U.S. Cl.
CPC ............ A61K 35/28 (2013.01); C01B 32/186 (2017.08); C01B 32/19 (2017.08); C01B 32/194 (2017.08); C12N 5/0667 (2013.01); C12N 5/0668 (2013.01); C01B 2204/04 (2013.01); C12N 2506/1346 (2013.01); C12N 2533/30 (2013.01)

(58) Field of Classification Search
CPC ............ C12N 5/0667; C12N 5/0668; C12N 2506/1346; C12N 2533/30; C01B 2204/04; C01B 2204/02
See application file for complete search history.

(56) References Cited

U.S. PATENT DOCUMENTS

2013/0095083 A1* 4/2013 Oezyilmaz ............... A61K 9/00
435/377

FOREIGN PATENT DOCUMENTS

| KR | 10-2016-0022761 A | 3/2016 |
| KR | 10-2016-0034541 A | 3/2016 |
| KR | 10-1737796 B1 | 5/2017 |
| KR | 10-2017-0081684 A | 7/2017 |
| WO | 2012/005699 A1 | 7/2011 |
| WO | 2017/177193 A1 | 10/2017 |
| WO | 2017/180901 A1 | 10/2017 |

OTHER PUBLICATIONS

Shan et al (Water-Soluble Graphene Covalently Functionalized by Biocompatible Poly-L-lysine. Langmuir 2009, 25(20), 12030-12033). (Year: 2009).*
Nayak et al (Graphene for Controlled and Accelerated Osteogenic Differentiation of Human Mesenchymal Stem Cells. ACS Nano, vol. 5, 4670-4678, 2011) (Year: 2011).*
Kim et al (Enhanced osteogenic commitment of murine mesenchymal stem cells on graphene oxide substrate. Biomaterials Research (2018) 22:1). (Year: 2018).*
Wu et al., "Laminate"—definition Science Direct <<https://www.sciencedirect.com/topics/materials-science/laminate>>published 2017 (Year: 2017).*
Bressan et al., "Graphene based scaffolds effects on stem cells commitment", Journal of Translational Medicine, Biomed Central, vol. 12, No. 1, 2014, p. 296 (15 pages).
Crowder et al., "Three-dimensional graphene foams promote osteogenic differentiation of human mesenchymal stem cells", Nanoscale, vol. 5, No. 10, 2013, pp. 4171-4176.
Kalbacova et al., "Graphene substrates promote adherence of human osteoblasts and mesenchymal stromal cells", Carbon, vol. 48, No. 15, 2010, pp. 4323-4329.
Lee et al., "Graphene enhances the cardiomyogenic differentiation of human embryonic stem cells", Biochemical and Biophysical Research Communications, vol. 452, No. 1, 2014, pp. 174-180.
Muzi et al., "Examining the impact of multi-layer graphene using cellular and amphibian models", 2D Materials, vol. 3, No. 2, 2016, p. 025009 (10 pages).

(Continued)

Primary Examiner — Emily A Cordas
Assistant Examiner — Matasha Dhar
(74) Attorney, Agent, or Firm — Vorys, Sater, Seymour and Pease LLP; Mih Suhn Koh

(57) ABSTRACT

Provided are a culture scaffold for promoting stem cell differentiation comprising a multilayer graphene film, a method of regulating growth and differentiation of a stem cell using the culture scaffold, and a method of preparing the culture scaffold, where the culture scaffold is capable of promoting the osteogenic differentiation of stem cells as a result of laminating a graphene film without comprising an additional substance, and it may be variously applicable to application fields of stem cells in/outside the body.

3 Claims, 5 Drawing Sheets
Specification includes a Sequence Listing.

(56) References Cited

OTHER PUBLICATIONS

Crowder et al., "Three-dimensional graphene foams promote osteogenic differentiation of human mesenchymal stem cells", Nanoscale, 2013, vol. 5, pp. 4171-4176.

Xie et al., "Graphene-Induced Osteogenic Differentiation is Mediated by the Integrin/FAK Axis", International Journal of Molecular Sciences, Jan. 29, 2019, vol. 20, Article No. 574, pp. 1-13.

* cited by examiner

1. SYNTHESIZED SINGLE-LAYER GRAPHENE ON METAL FILM
2. ETCHING SOLUTION
3. SINGLE-LAYER GRAPHENE
4. SYNTHESIZED SINGE-LAYER/LAMINATED GRAPHENE ON METAL FILM
5. DISTILLED WATER
6. LAMINATED GRAPHENE
7. CELL CULTURE SUBSTRATE

SEQUENCE LISTING

<160> NUMBER OF SEQ ID NOS: 6

<210> SEQ ID NO 1
<211> LENGTH: 19
<212> TYPE: DNA
<213> ORGANISM: Artificial Sequence
<220> FEATURE:
<223> OTHER INFORMATION: RUNX2 forward primer

<400> SEQUENCE: 1
gacagcccca acttcctgt                                            19

<210> SEQ ID NO 2
<211> LENGTH: 20
<212> TYPE: DNA
<213> ORGANISM: Artificial Sequence
<220> FEATURE:
<223> OTHER INFORMATION: RUNX2 reverse primer

<400> SEQUENCE: 2
ccggagctca gcagaataat                                           20

<210> SEQ ID NO 3
<211> LENGTH: 20
<212> TYPE: DNA
<213> ORGANISM: Artificial Sequence
<220> FEATURE:
<223> OTHER INFORMATION: OSTEOCALCIN forward primer

<400> SEQUENCE: 3
agcaaaggtg cagcctttgt                                           20

-continued

```
<210> SEQ ID NO 4
<211> LENGTH: 19
<212> TYPE: DNA
<213> ORGANISM: Artificial Sequence
<220> FEATURE:
<223> OTHER INFORMATION: OSTEOCALCIN reverse primer

<400> SEQUENCE: 4
gcgcctgggt ctcttcact                                                19

<210> SEQ ID NO 5
<211> LENGTH: 20
<212> TYPE: DNA
<213> ORGANISM: Artificial Sequence
<220> FEATURE:
<223> OTHER INFORMATION: GAPDH forward primer

<400> SEQUENCE: 5
gagtcaacgg atttggtcgt                                               20

<210> SEQ ID NO 6
<211> LENGTH: 20
<212> TYPE: DNA
<213> ORGANISM: Artificial Sequence
<220> FEATURE:
<223> OTHER INFORMATION: GAPDH reverse primer

<400> SEQUENCE: 6
ttgattttgg agggatctcg                                               20
```

CULTURE SCAFFOLD FOR PROMOTING STEM CELL DIFFERENTIATION COMPRISING MULTILAYER GRAPHENE FILM

CROSS-REFERENCE TO RELATED APPLICATIONS

This application is a 371 of PCT/KR2019/004061, filed Apr. 5, 2019, which claims the benefit of priority from Korean Patent Application No. 10-2018-0041267 filed Apr. 9, 2018, the contents of each of which are incorporated herein by reference in its entirety.

SEQUENCE LISTING

The Sequence Listing submitted in text format (.txt) filed on Oct. 8, 2020, named "SequenceListing.txt", created on Oct. 8, 2020 (1.21 KB), is incorporated herein by reference.

TECHNICAL FIELD

The present invention relates to a culture scaffold for promoting the differentiation of stem cells, including a multi-layer graphene film.

BACKGROUND ART

Stem cells refer to a broad concept referring to undifferentiated cells having the ability to differentiate into various types of body tissues, i.e., sternness, and these stem cells are broadly divided into embryonic stem cells, adult stem cells, gametes, and cancer stem cells, and the like. These stem cells not only are able to differentiate into various cells, but also can be used in various applications such as suppression of excessive immune responses, mediators for gene therapy, and production of various growth factors, and thus research on these stem cells as a novel cellular therapeutic agent is actively ongoing. Stem cells must not undergo a change in characteristics thereof during culture and differentiation capabilities of stem cells other than required differentiation must be suppressed, but when conventional culture apparatuses are used, there is a limitation on the above growth regulation of these stem cells. Therefore, there is a need for a culture scaffold which not only enables the culture of stem cells, but also enables easy differentiation of stem cells into target cells in full consideration of the characteristics of stem cells.

Meanwhile, in order to replace and treat damaged tissue or bone, a large number of in-vivo implantable inorganic scaffolds or protein-based organic scaffolds are commercially available and sold. These scaffolds are advantageous in terms of being easy to physically form a shape, biocompatibility, and biodegradability, but are not effective in promoting osteogenic differentiation due to low osteoconduction. Thus, biologically derived growth factors such as BMP-2 are further used to promote osteogenic differentiation, but the use of BMP-2 has limitations such as immune response problems, a short residence period, and cost problems (Korean Patent Publication No. 10-2017-0081684).

Therefore, through the development of a stem cell culture scaffold capable of promoting the in-vivo or in-vitro differentiation of stem cells into target cells, it is expected that the culture scaffold not only can be safely applied to various stem cell application fields, but can also exhibit a strong therapeutic effect on tissue or bone damage.

DESCRIPTION OF EMBODIMENTS

Technical Problem

The present invention has been devised to address the above-described problems of the related art, and an object of the present invention is to provide a culture scaffold for promoting the differentiation of stem cells including a multi-layered graphene film, and a method of manufacturing the culture scaffold.

However, technical problems to be solved by the present invention are not limited to the above-described technical problems, and other unmentioned technical problems will become apparent to those of ordinary skill in the art from the following description.

Technical Solution

According to an aspect of the present invention, there is provided a culture scaffold for promoting the differentiation of a stem cell, including a multi-layer graphene film. The promotion of the differentiation preferably means promotion of the osteogenic differentiation of a stem cell, more preferably, promotion of the osteogenic differentiation of a mesenchymal stem cell, but is not limited as long as it is promotion of differentiation on a multi-layer graphene film.

The present invention also provides a pharmaceutical composition for cell therapy including, as an active ingredient, a stem cell cultured on the culture scaffold. The pharmaceutical composition for cell therapy is preferably a pharmaceutical composition for treating diseases using cells, but is not limited as long as it is a pharmaceutical composition including, as an active ingredient, a stem cell cultured on the culture scaffold of the present invention. The diseases may be, preferably, bone diseases such as nonunion of fractures, hematopoietic necrosis of the femoral head, osteoporosis, and bone loss, degenerative arthritis, and cartilage diseases such as joint damage due to trauma, but is not limited as long as it is a disease that can be treated using the differentiation of stem cells.

The present invention also provides a method of regulating the growth and differentiation of a stem cell, the method including culturing the stem cell on a culture scaffold for promoting the differentiation of a stem cell, including a multi-layer graphene film. The method is preferably a method of regulating the growth and differentiation of a stem cell in vitro, but is not limited as long as it is a method using the culture scaffold for promoting the differentiation of a stem cell according to the present invention.

In one embodiment of the present invention, the stem cell may be, preferably, an embryonic stem cell, a gamete, an adult stem cell, or the like, and more preferably, may be a mesenchymal stem cell, an adipose-derived stem cell, a hematopoietic stem cell, a neural stem cell, or the like, but is not limited as long as it is a stem cell whose differentiation is promoted on the multi-layer graphene film of the present invention.

In another embodiment of the present invention, the multi-layer graphene film may be, preferably, two- to ten-layer laminated graphene, more preferably two- to seven-layer laminated graphene, more preferably two- to five-layer laminated graphene, and more preferably two- to four-layer laminated graphene, but the number of layers of graphene is not limited as long as it is a number of layers of graphene that enables promotion of the differentiation of a stem cell.

In another embodiment of the present invention, the multi-layer graphene film may have a wrinkle having a width of 20 nm to 60 nm.

In another embodiment of the present invention, the multi-layer graphene film may further include a cell adhesion molecule attached to a surface thereof, and the cell adhesion molecule may be, preferably, lysine, fibronectin, fibrinogen, laminin, vitronectin, or the like, and more preferably, may be poly-D-lysine or poly-L-lysine, but is not limited as long as it is a cell adhesion factor capable of increasing the adhesion of a cell.

The present invention provides a method of treating a bone disease, including administering, to an individual, the culture scaffold for promoting the differentiation of a stem cell including a multi-layer graphene film, or stem cells cultured on the culture scaffold.

The present invention also provides a use of a composition for treating a bone disease, the composition including, as an active ingredient, the culture scaffold for promoting the differentiation of a stem cell, including a multi-layer graphene film, or stem cells cultured on the culture scaffold.

The present invention also provides a method of manufacturing a culture scaffold for promoting the differentiation of a stem cell, the method including: (a) synthesizing a single-layer graphene film; and (b) laminating the synthesized graphene film.

In one embodiment of the present invention, the synthesis of the graphene film of process (a) may be performed using chemical vapor deposition (CVD), chemical exfoliation, diffusion-assisted synthesis (DAS), or the like, but the method is not limited as long as it is a generally known method of synthesizing a graphene film.

In another embodiment of the present invention, the method may further include, after process (a), transferring the synthesized single-layer graphene film onto a substrate, and the substrate may be, preferably, glass, silicon, a silicon wafer, a cell culture plate, or the like, but is not limited as long as it is a substrate for culturing cells.

In another embodiment of the present invention, the method may further include attaching a cell adhesion molecule onto a surface of the laminated multi-layer graphene film, and the cell adhesion molecule may be, preferably, lysine, fibronectin, fibrinogen, laminin, vitronectin, or the like, and more preferably, may be poly-D-lysine or poly-L-lysine, but is not limited as long as it is a cell adhesion factor capable of increasing the adhesion of a cell.

In another embodiment of the present invention, the method may further include patterning the surface of the graphene film using electron beam lithography, photolithography, or the like, and the patterning of the surface may be performed using a method commonly used in stem cell culture, but the present invention is not limited thereto.

Advantageous Effects of Invention

A culture scaffold for promoting the differentiation of stem cells, including a multi-layer graphene film according to the present invention not only is effective in promoting the osteogenic differentiation of stem cells only using the scaffold without using a material for promoting differentiation induction, but can also significantly reduce the occurrence of side effects since the scaffold is manufactured using only graphene consisting of carbon atoms that are harmless to the human body without the composition of other additional materials. Accordingly, the culture scaffold is expected to be applicable to various fields using stem cells. In addition, the multi-layer graphene film coated on the culture scaffold for promoting the differentiation of stem cells according to the present invention has excellent light transmittance, and thus can be additionally analyzed using an optical microscope, a fluorescence microscope, or Raman spectroscopy for various spectrometric analyses.

BEST MODE

Figure 1:
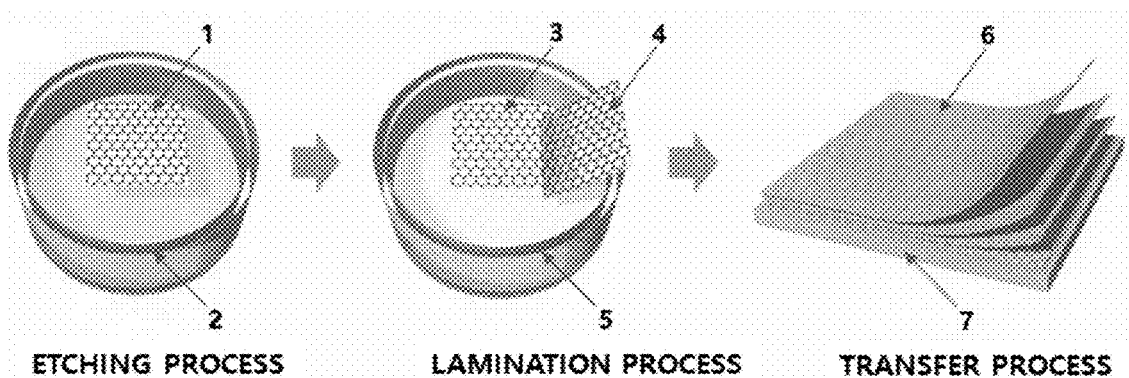
FIG. 1 is a schematic view illustrating a method of manufacturing a graphene film according to an embodiment of the present invention.

A culture scaffold for promoting the differentiation of stem cells, including a multi-layer graphene film, according to the present invention may effectively promote the differentiation of a stem cell through graphene film lamination without additional configuration of other materials. In particular, it has been confirmed that the culture scaffold can effectively promote the osteogenic differentiation of a mesenchymal stem cell, and thus the multi-layer graphene film of the present invention, or a stem cell cultured on the multi-layer graphene film may be used in fields using various stem cells in vivo/in vitro, such as osteogenesis and the treatment of bone diseases.

In the present specification, "graphene" is a material having an atomic-sized honeycomb structure made of carbon atoms, and is a next-generation new material having a thickness of 0.2 nm and very high physical and chemical stability, and "multi-layer graphene film" as used herein is a generic term for a structure in which single-layer graphene is laminated.

In the present specification, "stem cell" refers to a broad concept referring to undifferentiated cells having the ability to differentiate into various types of body tissue cells, i.e., stemness. These stem cells are broadly divided into embryonic stem cells, which can be produced using embryos, adult stem cells, gametes, and cancer stem cells. Embryonic stem cells refer to the cell mass stage prior to forming specific organs within 14 days after fertilization, and recently, embryonic stem cells may be produced from normal cells through dedifferentiation. Thus, stem cells are not limited as long as they are cells capable of differentiating into all cells and tissues constituting the body. Adult stem cells are extracted from umbilical cord blood, bone marrow, blood, and the like, and refer to primitive cells immediately before differentiation into cells of specific organs such as bone, the liver, blood, and the like. Gametes are cells that pass down genetic information to the next generation through reproduction, and include human sperms and eggs, but the present invention is not limited thereto. Cancer stem cells refer to cancer cells in a comprehensive sense that have a self-renewal or differentiation ability, i.e., sternness, which is a characteristic ability of stem cells. Cancer stem cells generally proliferate at a slow rate or maintain the dormant state, unlike general cancer cells, under normal tumor growth conditions (referring to a state in which nutrients (glucose) necessary for cell growth are sufficient and the growth conditions of a tumor microenvironment are sufficient, and thus there is no cellular stress), and thus may have resistance to anticancer agents. For example, the expression of transcriptional regulators such as PGC-1α is controlled unlike normal tumor cells, and thus the functions of major metabolic regulators may differ from those of general cancer cells. Cancer stem cells comprehensively refer to cells that have acquired resistance to apoptosis in a nutrient-deficient state through these different metabolic regulation capabilities and the regulation of the cellular signal transduction system that is mechanically linked thereto, and have invasive and metastatic capabilities. However, cancer stem cells are not limited as long as they are cells capable of differentiating into general cancer cells.

In the present specification, "differentiation" refers to a process in which, during division, proliferation, and growth, stem cells attain characteristic structures or functions, and thus are changed into cells of different tissues.

In the present specification, "treatment" means all actions that alleviate or beneficially change symptoms due to bone diseases via administration of the composition according to the present invention.

In the present specification, "individual" refers to a subject to which the composition of the present invention can be administered, and the subject is not limited.

In the present specification, "pharmaceutical composition" may take the form of capsules, tablets, granules, injections, ointments, powders, or beverages, and the pharmaceutical composition may be intended for humans as a subject. The pharmaceutical composition is not limited to the above examples, and may be formulated in the form of oral preparations such as powders, granules, capsules, tablets, and an aqueous suspension, preparations for external application, suppositories, and sterile injection solutions, according to general methods. The pharmaceutical composition of the present disclosure may include a pharmaceutically acceptable carrier. The pharmaceutically acceptable carrier may be a binder, a lubricant, a disintegrant, an excipient, a solubilizing agent, a dispersant, a stabilizer, a suspension agent, a pigment, a flavoring agent, or the like in the case of oral administration, may be used in combination with a buffer, a preservative, an analgesic agent, a solubilizer, an isotonic agent, a stabilizer, or the like in the case of injections, and may be a base, an excipient, a lubricant, a preservative, or the like in the case of local administration. Preparations of the pharmaceutical composition of the present invention may be formulated in a variety of ways by mixing with the above-described pharmaceutically acceptable carrier(s). For example, preparations for oral administration may be formulated in the form of tablets, troches, capsules, elixirs, suspensions, syrups, wafers, or the like, and preparations for injections may be formulated in unit dosage ampoules or in multiple dosage form. In addition, preparations of the pharmaceutical composition may be formulated in the form of solutions, suspensions, tablets, capsules, sustained release type preparations, or the like.

Meanwhile, examples of suitable carriers, excipients and diluents for formulation include lactose, dextrose, sucrose, sorbitol, mannitol, xylitol, erythritol, maltitol, starch, acacia gum, alginates, gelatin, calcium phosphate, calcium silicate, cellulose, methyl cellulose, micro-crystalline cellulose, polyvinylpyrrolidone, water, methyl hydroxybenzoate, propyl hydroxybenzoate, talc, magnesium stearate, mineral oil, and the like. In addition, the pharmaceutical composition may further include a filler, an anti-coagulant, a lubricant, a wetting agent, a flavoring agent, an emulsifier, a preservative, or the like.

Administration routes of the pharmaceutical composition according to the present disclosure include, but are not limited to, oral administration, intravenous administration, intramuscular administration, intraarterial administration, intramedullary administration, intradural administration, intracardiac administration, transdermal administration, subcutaneous administration, intraperitoneal administration, intranasal administration, intestinal administration, topical administration, sublingual administration, and rectal administration. Oral or parenteral administration is preferable. The term "parenteral" as used herein is intended to include subcutaneous, intradermal, intravenous, intramuscular, intraarticular, intrabursal, intrasternal, intradural, intralesional, and intracranial injections or injection techniques. The pharmaceutical composition of the present invention may also be administered in the form of a suppository for rectal administration.

The pharmaceutical composition of the present invention may vary depending on various factors including the activity of the used specific compound, age, body weight, general health, gender, diet, administration time, administration route, excretion rate, drug combination, and the severity of a particular disease to be prevented or treated, and a dosage of the pharmaceutical composition varies according to the condition and body weight of a patient, the severity of disease, drug form, administration route, and administration period, but may be appropriately selected by one of ordinary skill in the art, and may range from 0.0001 mg/kg to 50 mg/kg or 0.001 mg/kg to about 50 mg/kg. Administration may be performed once a day, or multiple times a day. The dosage is not intended to limit the scope of the present disclosure in any way. The pharmaceutical composition according to the present disclosure may be formulated into pills, dragees, capsules, a liquid, a gel, a syrup, a slurry, or a suspension.

Hereinafter, the following examples will be described to aid in understanding the present invention. However, these examples are provided merely to facilitate the understanding of the present invention and are not intended to limit the contents of the present invention.

EXAMPLES

Example 1: Fabrication of Graphene Film

A graphene film was fabricated using chemical vapor deposition (CVD). In order to fabricate a graphene film, a nickel film or a copper film as a catalyst was loaded into a quartz tube. Methane or acetylene gas was added at 1,000° C. to allow carbon to permeate into the catalyst layer or onto the surface thereof. After a reaction was allowed to occur for 30 minutes to 60 minutes, the resultant structure was cooled to room temperature at the same rate as a natural cooling rate, and the catalyst film was removed using an etching solution such as ammonium persulfate (APS) or an iron(III) chloride solution, thereby completing the fabrication of a single-layer graphene (SLG) film. In order to transfer the fabricated graphene to a substrate, poly(methyl methacrylate) (PMMA) was spin-coated on the graphene, and PMMA/graphene was transferred to a glass substrate, a silicon wafer, or a cell culture plate. Subsequently, PMMA was removed using acetone, and then acetone was removed using distilled water. In addition, up to 10 layers of the fabricated single-layer graphene were laminated in distilled water to fabricate a multi-layer graphene (MLG) film. The transfer method was performed in the same manner as that used for the single-layer graphene film. The graphene film fabrication method is schematically illustrated in FIG. 1. The fabricated graphene film was confirmed using a scanning electron microscope (SEM). The results thereof are illustrated in FIG. 2.

Figure 2:
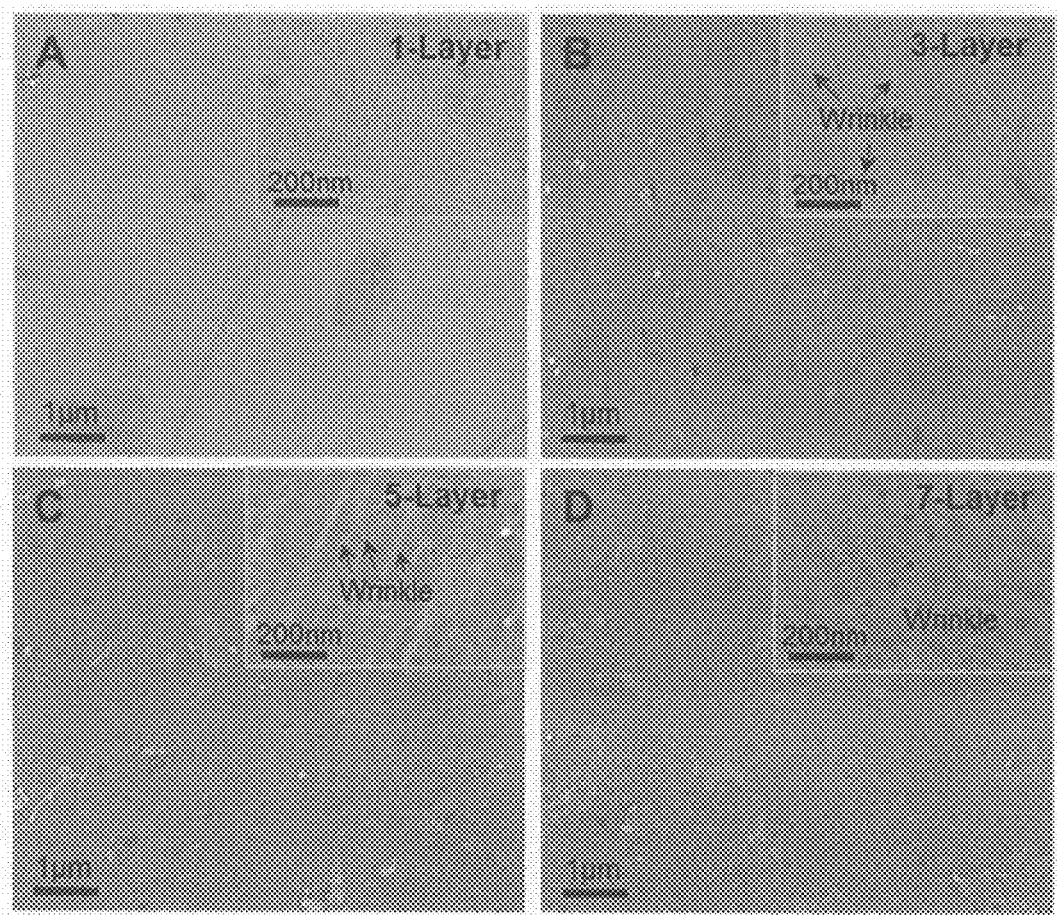
FIG. 2 illustrates scanning electron microscope observation results of a graphene film produced according to an embodiment of the present invention.

As illustrated in FIG. 2, it was confirmed that a single-layer or multi-layer graphene film was fabricated to have the desired number of layers, and it was confirmed that, as the number of laminated graphene layers increased, wrinkles having a width of about 30 to 50 nm were formed on the surface of the graphene and the formation of wrinkles was increased.

Example 2: Experiment for Promoting Osteogenic Differentiation of Mesenchymal Stem Cells Using Multi-Layer Graphene Film 2.1. Experiment for Induction of Osteogenic Differentiation In order to confirm the effective induction of osteogenic differentiation of human adipose tissue-derived mesenchymal stem cells, stem cells were diffentiated on a glass substrate coated with graphene fabricated in the same manner as in Example 1. Particularly a glass substrate has one layer of a graphene film, a two layer-, three layer-, five layer-, or seven layer-laminated graphene film coated thereon. To confirm the optimal osteogenic differentiation induction environment, $1 \times 10^5$ cells/well of mesenchymal stem cells were seeded on a glass substrate with a multi-layer graphene film coated thereon and an uncoated glass substrate (control) in a 24-well culture plate, and then when the confluency reached about 90%, osteogenic differentiation was induced. The osteogenic differentiation was performed while being cultured for 14 days in each case, under the following culture environments, and media were replaced once every three days: 1) on a glass substrate without graphene film lamination in a DMEM low glucose medium excluding a differentiation inducer and supplemented with 10% fetal bovine serum and 1% antibiotic (control); 2) on a glass substrate that was not coated with a graphene film in an osteogenic induction differentiation medium; 3) on a glass substrate coated with a graphene film in a control medium (a DMEM low glucose medium supplemented with 10% fetal bovine serum and 1% antibiotic); and 4) on a glass substrate coated with a graphene film in an osteogenic induction differentiation medium. As the osteogenic induction differentiation medium, a DMEM low glucose medium supplemented with 0.05 mM ascorbate-2-phosphate, 10 mM β-glycerophosphate, $10^{-7}$M dexamethasone, 10% fetal bovine serum, and 1% antibiotic was used.

2.2. Confirmation of Osteogenic Differentiation Efficiency through Alizarin Red S Staining To confirm osteogenic differentiation efficiency after osteogenic differentiation was induced in the same manner as in Example 2.1, Alizarin red S (ARS, Sigma) staining was performed. Since ARS has a property of binding to metal ions, it is possible to determine the presence or absence of osteogenic differentiation by staining calcium precipitation (mineralization) secreted by cells. For staining, cell samples at the time of completion of differentiation were treated with 4% paraformaldehyde (PFA) to fix cells at room temperature for 15 minutes. The fixed cells were washed twice with distilled water, and then treated with a 1% ARS staining solution at room temperature for 15 minutes. At this time, the ARS solution was used after adding 1% ARS to distilled water having a pH of 4.5, and stirring the resultant solution using a magnetic bar for 18 hours, followed by filtering. The stained cells were washed five times with distilled water, and then the presence or absence of ARS staining was confirmed under an optical microscope and photographed. Subsequently, in order to quantify the amount of ARS stained according to the above experiment, moisture remaining in the container was removed, and then 500 µL of a 10% cetylpyridinium chloride (CPC) buffer was added, and a reaction was allowed to occur at room temperature for 30 minutes to elute the ARS. The eluted ARS was dispensed into a 96-well plate (SPL) in an amount of 200 µL/well, and the absorbance was measured at 550 nm using a microplate reader (Molecular Device). The results thereof are illustrated in FIG. 3.

Figure 3:
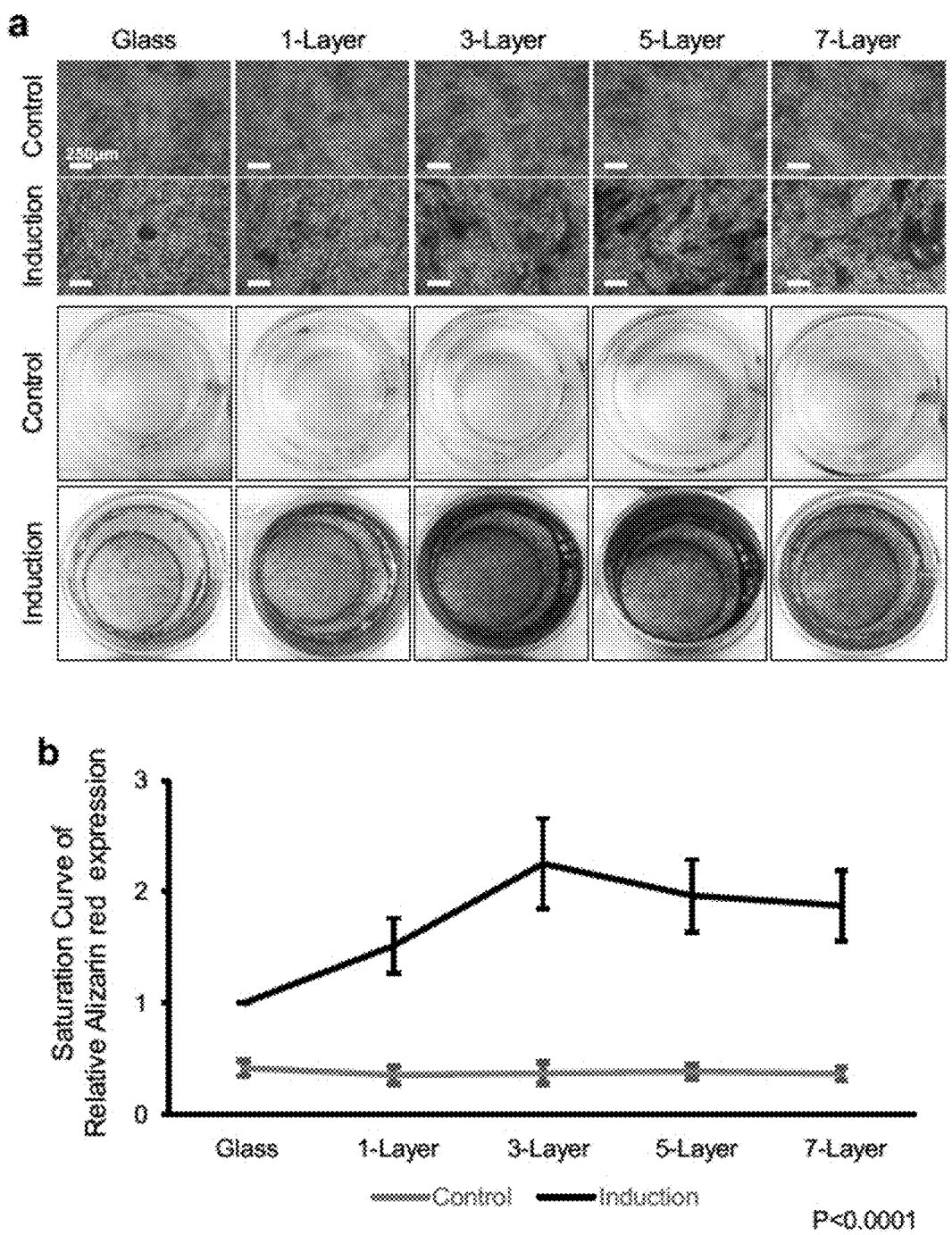
FIG. 3 illustrates the results of photographing the degree of differentiation of human adipose-derived mesenchymal stem cells according to the composition of a stem cell culture medium or an osteogenic induction differentiation medium depending on the lamination degree (1-layer, 3-layer, 5-layer, and 7-layer) of a graphene film (a) according to an embodiment of the present invention, and illustrates a graph obtained by quantitatively calculating the degree of osteogenic differentiation (b).

As shown in FIG. 3, it was confirmed that, compared with the glass substrate that was not coated with graphene (control), osteogenic differentiation was increased in the glass substrate coated with a graphene film, and compared with a single-layer graphene film, osteogenic differentiation was effectively increased in 14 days on the substrate coated with a multi-layer graphene film. It was also confirmed that a three-layer graphene film was most effective for osteogenic differentiation of stem cells, and in the case of lamination to greater than five layers, osteogenic differentiation efficiency was reduced, and the differentiation of stem cells was not promoted in a basal culture medium.

Additionally, in order to specifically confirm the effect of a multi-layer graphene film on the osteogenic differentiation of stem cells, an osteogenic differentiation experiment was performed in the same manner using single-layer, two-layer, and three-layer graphene films. The results thereof are illustrated in FIG. 4.

Figure 4:
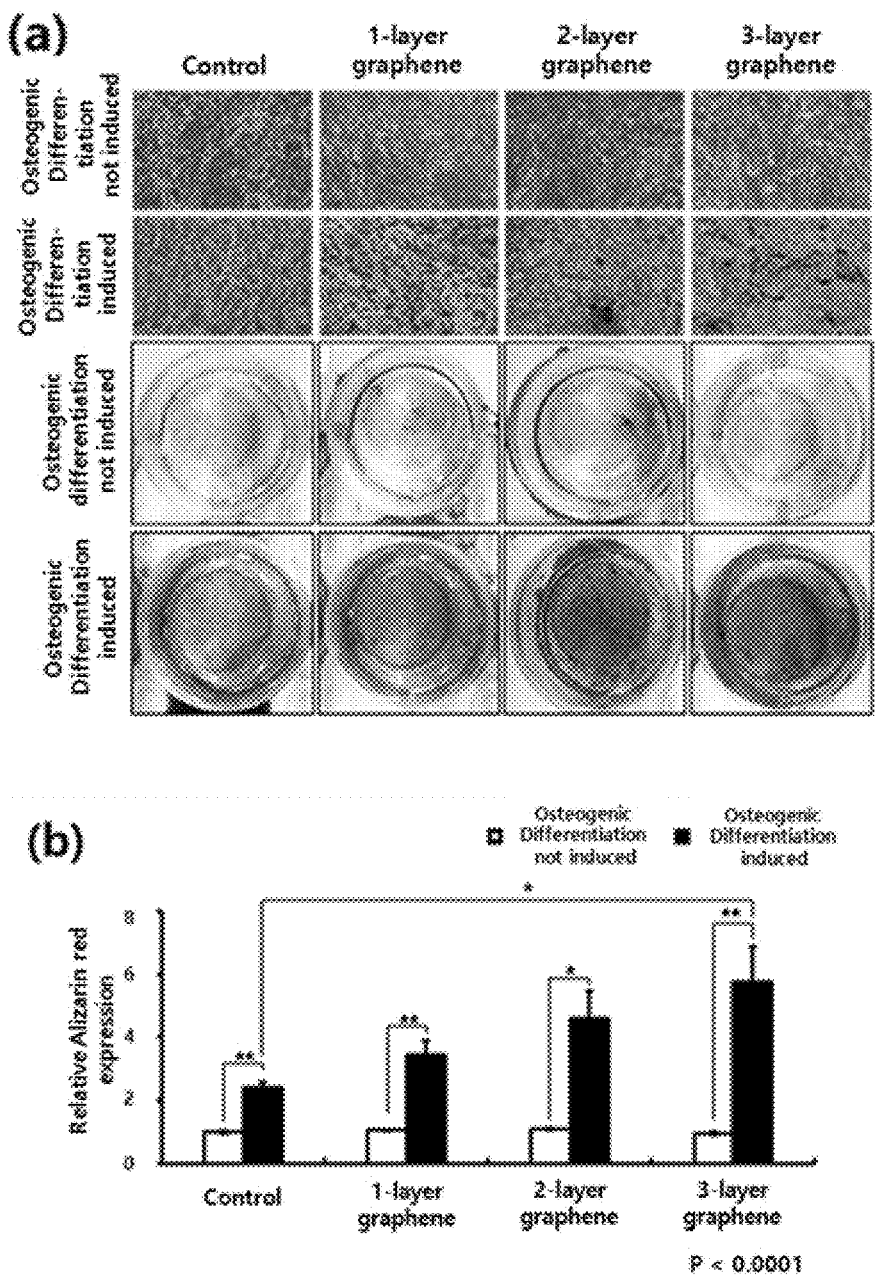
FIG. 4 illustrates the results of photographing the degree of differentiation of mesenchymal stem cells depending on the degree (1-layer, 2-layer, and 3-layer) of lamination of a graphene film (a) according to an embodiment of the present invention, and illustrates a graph obtained by quantitatively calculating the degree of osteogenic differentiation (b).

As shown in FIG. 4, it was confirmed that, the same as the above experiment results, the osteogenic differentiation of mesenchymal stem cells was significantly promoted most effectively on a three-layer graphene film.

From the above results, it was confirmed that two- to four-layer graphene films were effective for the osteogenic differentiation of stem cells, and among the films, the three-layer graphene film was most effective, and the time point of stem cell differentiation can be accurately controlled using the multi-layer graphene film of the present invention.

2.3. Runx2 and Osteocalcin Gene Analysis

In order to accurately analyze the induction of osteogenic differentiation on the multi-layer graphene film of the present invention, particularly two- and three-layer glass substrates, the expression levels of the Runx2 and osteocalcin genes in mesenchymal stem cells having undergone osteogenic differentiation in the same manner as in Example 2.2 were analyzed using real-time PCR. The Runx2 and osteocalcin genes are known as key transcription factors for osteogenic differentiation. Specifically, mRNA was extracted by phenol-chloroform extraction using a TRIzol reagent, and cDNA was synthesized using reverse transcription-polymerase chain reaction (RT-PCR), and then real-time PCR was performed using primers specific to Runx2, osteocalcin, and the GAPDH gene as a control gene. Information on the primers used in PCR is shown in Table 1 below. The results of analyzing the relative gene expression levels by electrophoresis of the PCR products on an agarose gel are shown in FIG. 5.

TABLE 1

| Gene | Primer sequence | SEQ ID NO: |
|---|---|---|
| human Runx2 | 5'-gacagccccaacttcctgt-3' | 1 |
|  | 5'-ccggagctcagcagaataat-3' | 2 |
| human Osteocalcin | 5'-agcaaaggtgcagcctttgt-3' | 3 |
|  | 5'-gcgcctgggtctcttcact-3' | 4 |
| human Gapdh | 5'-gagtcaacggatttggtcgt-3' | 5 |
|  | 5'-ttgattttggagggatctcg-3' | 6 |

Figure 5:
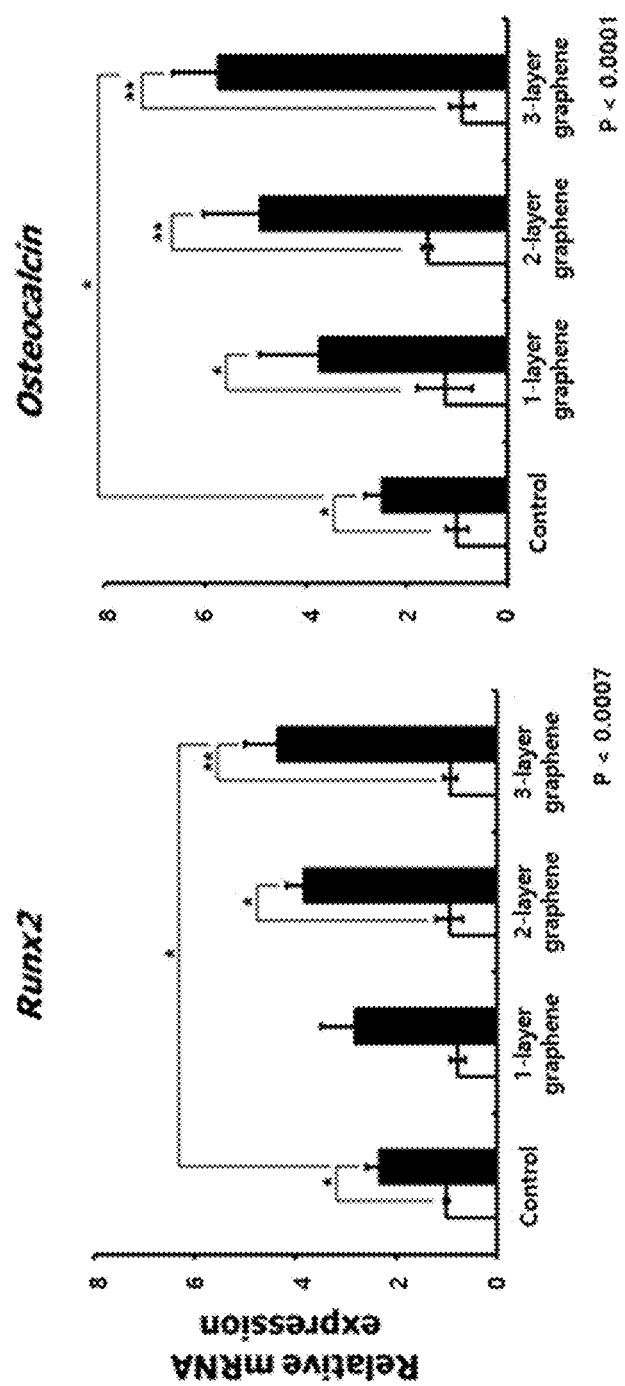
FIG. 5 illustrates the results of quantitatively calculating the expression levels of the Runx2 and osteocalcin genes of mesenchymal stem cells according to the degree (single-layer, two-layer, and three-layer) of lamination of graphene according to an embodiment of the present invention and the composition of a stem cell culture medium or an osteogenic induction differentiation medium.

As shown in FIG. 5, it was confirmed that, compared with the control (white bar) in which osteogenic differentiation was not induced, expression of the Runx2 and osteocalcin genes was effectively increased quantitatively significantly on the two- and three-layer graphene films of the experimental groups (black bars) in which osteogenic differentiation was induced.

From the above results, it was confirmed that the osteogenic differentiation of mesenchymal stem cells was effectively promoted by coating with the multi-layer graphene film, and the differentiation induction effect was effectively improved in two- to five-layer graphene. Through this, it was confirmed that various substrates, such as a glass substrate, a silicon wafer, and a cell culture plate, onto which the multi-layer graphene film is transferred can be widely used as a culture scaffold for promoting the differentiation of stem cells.

While specific embodiments of the present invention have been described in detail, it will be obvious to those of ordinary skill in the art that these detailed descriptions are merely exemplary embodiments and are not intended to limit the scope of the present invention. Therefore, the substantial scope of the present invention should be defined by the appended claims and equivalents thereto.

INDUSTRIAL APPLICABILITY

A culture scaffold for promoting the differentiation of stem cells, including a multi-layer graphene film according to the present invention not only is effective in promoting the osteogenic differentiation of stem cells only using the scaffold without using a material for promoting differentiation induction, but can also significantly reduce the occurrence of side effects since the scaffold is manufactured using only graphene consisting of carbon atoms that are harmless to the human body without the composition of other additional materials. Thus, the culture scaffold is expected to be effectively applicable to various in-vivo and in-vitro treatments requiring osteocytes.

The invention claimed is:

1. A method of promoting the osteogenic differentiation of a mesenchymal stem cell, comprising culturing the mesenchymal stem cell on a culture scaffold,
wherein the culture scaffold is for promoting the osteogenic differentiation of the mesenchymal stem cell, the culture scaffold comprises a multi-layer graphene film, wherein the multi-layer graphene film is two- to seven-layer laminated graphene formed by lamination of single-layered graphene in two to seven layers, and wherein the multi-layer graphene film has wrinkles having a width of 20 to 60 nm.

2. The method of claim 1, wherein the multi-layer graphene film further comprises a cell adhesion molecule attached to a surface thereof.

3. The method of claim 2, wherein the cell adhesion molecule is one or more selected from the group consisting of lysine, fibronectin, fibrinogen, laminin, and vitronectin.

* * * * *